United States Patent Office 3,538,097
Patented Nov. 3, 1970

3,538,097
SUBSTITUTED PIPERAZINO-BIS-BENZIMID-
AZOLES HAVING ANTHELMINTIC AND
BACTERIOSTATIC ACTIVITY
Heinz Loewe, Kelkheim, Taunus, Josef Urbanietz,
Schwalbach, Taunus, and Georg Lämmler, Giessen,
Germany, assignors to Farbwerke Hoechst Aktien-
gesellschaft vormals Meister Lucius & Bruning, Frank-
furt am Main, Germany, a corporation of Germany
No Drawing. Filed Mar. 23, 1967, Ser. No. 625,329
Claims priority, application Germany, Apr. 1, 1966,
F 48,833
Int. Cl. C07d 51/70
U.S. Cl. 260—268                                8 Claims

ABSTRACT OF THE DISCLOSURE

Substituted piperazino-bis-benzimidazoles, having ant-
helmintic and bacteriostatic activity, of the formula

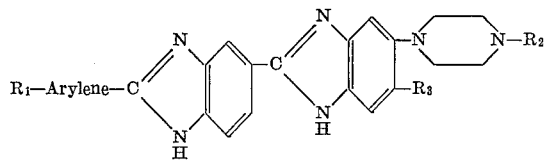

Methods for making these compounds.

---

The present invention relates to basically substituted
bis-benzimidazole derivatives of the general Formula I

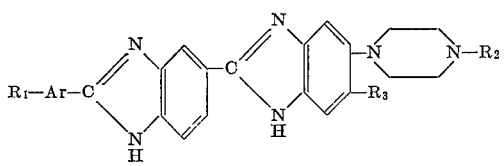

in which Ar represents an arylene radical, $R_1$ represents
hydrogen or halogen atoms, hydroxy, lower alkyl, alkoxy,
mercapto, alkylmercapto, an alkylene-dioxy or a nitro
group, a phenyl radical or an amino group which may be
substituted by alkyl, $R_2$ represents hydrogen, or alkyl
which may be substituted, carbalkoxy, carbamido, aryl or
aralkyl, and $R_3$ represents a halogen atom, lower alkyl or
alkoxy, and their salts. The compounds of the present in-
vention are distinguished by a strong anthelmintic activity.

The present invention also provides a process for pre-
paring the above-identified compounds, wherein (a) An o-phenylene-diamino derivative of the general
Formula II

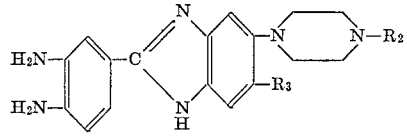

in which $R_2$ and $R_3$ have the meanings given above, is re-
acted either with a carboxylic acid of the general Formula
III $$R_1-Ar-COOH \qquad (III)$$

in which $R_1$ and Ar have the meanings given above, or
with a reactive functional derivative thereof, or with an
aldehyde of the general Formula IV $$R_1-Ar-CHO \qquad (IV)$$

in which $R_1$ and Ar have the meanings given above, with
the addition of an oxidizing agent if this is indicated; or (b) An o-phenylene-diamino derivative of the Formula
V

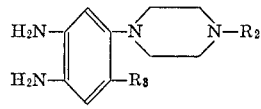

in which $R_2$ and $R_3$ have the meanings given above, is
reacted either with a carboxylic acid of the general For-
mula VI

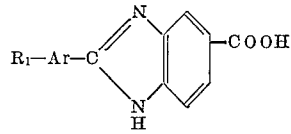

in which $R_1$ and Ar have the meanings given above, or a
reactive functional derivative thereof, or with an aldehyde
of the Formula VII

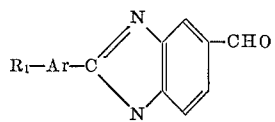

in which $R_1$ and Ar have the meanings given above, with
the addition of an oxidizing agent if this is indicated; or (c) Compounds of the general Formula VIII

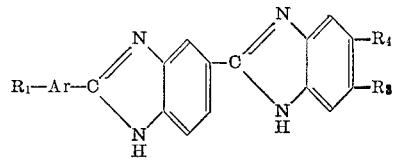

in which $R_4$ represents a halogen atom or an etherified
hydroxy group, and $R_1$ Ar and $R_3$ have the meanings
given above, are reacted with piperazines of the formula

in which $R_2$ has the meaning given above; or (d) Compounds of the general Formula I, in which $R_1$
represents a halogen atom or an etherified hydroxy group,
are reacted with ammonia or primary or secondary ali-
phatic amines; or (e) Compounds of the general Formula I in which $R_1$
represents a nitro group are reduced; or (f) Compounds of the general Formula I, in which $R_1$
represents an ether group, are treated with ether-disso-
ciating agents; or (g) Compounds of the general Formula I, in which $R_2$
represents the benzyl radical, are hydrogenated catalyti-
cally, and, if desired, the basic compounds obtained are
converted into salts by the reaction with physiologically
tolerated acids.

As the substituent $R_1$, there may be mentioned halogen
atoms, in particular bromine, chlorine and fluorine atoms,
and as low molecular weight alkyl groups, there may be
mentioned those containing 1–4 carbon atoms, preferably
the methyl group. As alkoxy groups, there may be men-
tioned those containing up to 4 carbon atoms, for ex-
ample, the following groups: isopropoxy, isobutoxy, $\beta$-
methoxy-ethoxy, $\beta$-methoxy-propoxy, $\gamma$-methoxy-propoxy
or $\beta$-hydroxy-ethoxy. As alkylmercapto groups, there may
be mentioned those containing 1–4 carbon atoms, for ex-
ample the following groups: methyl-mercapto, ethyl-mer-
capto, propyl-mercapto, isopropyl-mercapto, butyl-mer-
capto, isobutyl-mercapto, $\beta$-methoxy-ethyl-mercapto or
$\gamma$-methoxy-propyl-mercapto. As alkylene-dioxy groups, there may be mentioned the ethylene-dioxy group. As alkyl-substituted amino groups, there may be mentioned especially dialkyl-substituted amino groups such as, for example, as the following groups: diethylamino, dipropylamino, dibutyl-amino or mono-alkyl-substituted amino groups the alkyl radical of which contains 1–4 carbon atoms.

As the substituent $R_2$ at the piperazine radical, there may be mentioned substituted alkyl radicals, especially alkoxyalkyl radicals such as the β-methoxy-ethyl radical or basically substituted alkyl radicals such as β-dialkyl-aminoethyl radicals. As carbalkoxy radicals, there may be mentioned especialy carbethoxy radicals and as aralkyl radicals, there may be mentioned especially the benzyl radical.

As the substituent $R_3$, there enter into consideration halogen atoms, especially bromine, chlorine, or fluorine atoms, as low molecular weight alkyl radicals there may be mentioned those containing 1–4 carbon atoms, preferably the methyl radical; as alkoxy groups, there may be mentioned, for example, the methoxy, ethoxy, propoxy, isopropoxy, butoxy or isobutoxy radicals. As arylene radical Ar, there may be mentioned, for example, the phenylene radical or polynucleic arylene radicals such as the naphthylene-1 or naphthylene-2 radical.

As the o-phenylene-diamino derivatives of the general Formula II which are used as the starting materials in the method (a) of the process of the present invention, there may be mentioned 2-(3,4-diamino-phenyl)-5-piperazino-benzimidazole, and, further, those 2-(3,4-diamino-phenyl)-5-(4-piperazino)-benzimidazoles which carry in 1-position of the substituents listed for $R_2$.

The aforementioned 2-(3,4-diamino-phenyl)-5-piperazino-benzimidazole derivatives which are additionally substituted in 6-position by halogen atoms, especially bromine, chlorine or fluorine, or by low molecular weight alkyl or alkoxy groups containing 1–4 carbon atoms, for example, the methyl, methoxy, ethoxy, propoxy, isopropoxy, butoxy or isobutoxy group, may also be used as starting materials.

As carboxylic acids of the general Formula III which may be used as starting substances, there may be mentioned benzoic acid and substituted benzoic acids, especially those substituted in 4-position. Exemplary compounds are halogeno-benzoic acids, preferably bromo-, chloro- or fluoro-benzoic acid; hydroxybenzoic acids; furthermore alkyl-benzoic acids the alkyl group of which contains 1–4 carbon atoms, in particular 4-methylbenzoic acid; alkoxy-benzoic acids which contain up to 4 carbon atoms in the alkoxy radical, for example, methoxy-, ethoxy-, propoxy-, isopropoxy-, butoxy-, isobutoxy-, β-methoxy-ethoxy-, β-methoxy-propoxy-, γ-methoxy-propoxy- or β-hydroxy-ethoxy-benzoic acids. Further compounds are mercapto-benzoic acid and alkylmercapto-benzoic acids containing 1–4 carbon atoms in the alkylmercapto group, for example, methyl-, ethyl-, propyl-, isopropyl-, butyl-, isobutyl-, β-methoxyethyl-, or γ-methoxy-propyl-mercaptobenzoic acids; alkylene-dioxy-benzoic acids such as methylene-dioxy- or ethylene-dioxy-benzoic acid; nitrobenzoic acid; phenyl-benzoic acid; amino-benzoic acid and dialkyl-substituted amino-benzoic acids such as dimethylamino-, diethylamino-, dipropylamino-, and dibutylamino-benzoic acids. Further compounds are those substituted benzoic acids which contain two or more substituents in the molecule, for example, halogeno-toluic acids, in particular 3-chloro-4-toluic acid or 4-chloro-3-toluic acid; nitroamino-benzoic acids; nitrochloro-benzoic acids; methoxychloro-benzoic acids; di-halogeno-benzoic acids; di-hydroxybenzoic acids; and alkoxy-toluic acids.

As reactive derivatives; the acid chlorides of the mentioned carboxylic acids, their acid anhydrides and their imino-ethers, preferably the ethyl- or β-methoxy-ethyl-imino-ethers; may be used, as well as the chlorides of the corresponding ortho-carboxylic acids such as benzo-trichloride.

If the process is started from the carboxylic acids themselves, these are melted for some time at an elevated tempertaure, preferably at a temperature above the melting point of the reactants, with the o-phenylene-diamino derivatives described above. The products formed thereby are isolated as free bases by first dissolving the reaction mixture in acetic acid, filtering it if necessary and combining it with ammonia. It is also possible to heat the carboxylic acid together with the o-phenylene-diamino derivative in semi-concentrated mineral acids, such as 20% hydrochloric acid, for a prolonged period of time, to an elevated temperature, advantageously to 200° C., under pressure, and to isolate the products formed as free bases by adding ammonia to the solution which, if necessary or desired, has been filtered previously. For purification, the bases are dissolved in a low molecular weight aliphtic alcohol, for example methanol, isopropanol or butanol, and reprecipitated as hydrates by the addition of a small amount of water.

If the process is started from acid chlorides, an excess amount of an acid chloride of one of the aforementioned carboxylic acids, is heated with one of the o-phenylene-diamino derivatives, preferably to the boiling point of the acid chloride. After cooling, a diacyl compound is obtained which is converted into the product of the invention upon heating in an excess quantity of a mineral acid, preferably a hydrohalic acid such as semiconcentrated hydrochloric acid or polyphosphoric acid. The products are isolated by evaporation of the excess acid under reduced pressure and precipitation of the base by means of a substance having an alkaline action.

If the process is started from imino-ethers which are obtained from the corresponding acid nitriles in known, manner, for example by the reaction with gaseous hydrogen chloride and alcohol, preferably ethanol or methyl glycol, described by Pinner in "Die Imidoäther und ihre Derivate" (Berlin 1892), these ethers are reacted according to the process of the present invention with a corresponding derivative of the o-phenyl-diamine in the presence of a solvent having an acid reaction, preferably a low molecular weight aliphatic carboxylic acid such, for example, as glacial acetic acid or propionic acid, at an elevated temperature, preferably at the boiling temperature of the solvent used.

For isolating the product, the solvent, when the reaction is complete, is evaporated under reduced pressure, suitably in the vacuum produced by a water jet pump, the residue is dissolved in water and the base formed is liberated by the addition of a substance having an alkaline action, for example, ammonia or a sodium hydroxide solution.

If, instead of a carboxylic acid or of one of the reactive derivatives thereof, an aldehyde of the general Formula IV is those aldehydes are employed which correspond to the afore-described benzoic acids of the Formula III. They are heated in dilute acids, for example dilute acetic acid, with the addition of an oxidizing agent, preferably copper acetate, for some time to an elevated temperature, advantageously to the boiling temperature of the reaction mixture. The products formed can also be isolated by salting out their hydrohalides by the addition of a strong hydrohalic acid or of a concentrated solution of a halide, especially sodium chloride or potassium iodide. Or the products can also be isolated by introducing hydrogen sulfide into the reaction mixture when the reaction is complete thereby decomposing the dissolved copper salt, filtering off with suction from the precipitated copper sulfide and evaporating the filtrate to dryness.

For the method (b) of the process of the invention, the o-phenyl-diamino derivatives of the general Formula V which may be used as starting materials are 4-(3,4-diamino-phenyl)-piperazine and its derivatives in which the piperazine ring may be substituted in 1-position by one of the substituents listed for $R_2$ and which may carry in the phenyl radical, in o-position, a halogen atom, an alkyl or alkoxy group.

As carboxylic acids of the general Formula VI which may be used as starting materials, there may be mentioned 2-phenyl-benzimidazole-6-carboxylic acid and the derivatives thereof in which the phenyl group carries in 2-position the same substituents as those in the aforementioned benzoic acid derivatives of the general Formula III, for example 2-(p-hydroxy- or alkoxy-phenyl)-benzimidazole-6-carboxylic acids, and further, 2-(1- or 2-naphthyl)-benzimidazole-6-carboxylic acid.

As reactive derivatives, there may be used the same compounds as those used in the case of carboxylic acids of the general Formula III. The method of carrying out the reaction corresponds to the method (a) of the process of the present invention.

If, instead of carboxylic acids of the general Formula VI, an aldehyde of the general Formula VII is used, there may be employed 2-phenyl-benzimidazole-6-aldehyde and its derivatives, which are substituted in a manner corresponding to that of the afore-described carboxylic acids of the general Formula VI.

Also in this case, the method of carrying out the process corresponds to the method described under (a) with regard to the reaction of aldehydes of the general Formula IV.

As compounds of the general Formula VIII which are used as starting substances in method (c) of the process of the invention, there may be mentioned 2-(2-phenyl-6-benzimidazolyl)-6-chloro- or 6-fluoro-benzimidazole, 2-(2-phenyl-6-benzimidazolyl)-6-alkyloxy- or 6-aryloxy-benzimidazole, especially 2(2-phenyl-6-benzimidazolyl)-6-methoxy- or 6-phenoxy-benzimidazole, as well as the substitution products of the mentioned compounds in which the phenyl group is substituted by one of the substituents listed for $R_1$. 2-(1- or 2-naphthyl-6-benzimidazolyl)-6-chlorofluoro-, -methoxy- or -phenoxy-benzimidazole can also be used.

For the reaction with the compounds of the Formula VIII there may be used, in addition to piperazine itself, also its derivatives which are substituted at the $N_1$-atom, preferably 1-methyl-, ethyl-, propyl-, isopropyl-, butyl-, isobutyl-, benzyl-, phenyl-, β-hydroxyethyl-, β-methoxy-methyl-, β-diethylamino-ethyl-, or carbethoxy-ethyl-piperazine.

The reaction can be effected in the presence or in the absence of solvents. As solvents, there are preferably used aromatic hydrocarbons, for example, benzene, toluene or xylene, or dimethylformamide or dimethyl-sulfoxide; toluene is preferred.

The said reaction is carried out at an elevated temperature, advntageously at the boiling temperature of the solvent used. It is of advantage to add acid binding agents, for example sodium carbonate or tertiary organic bases, but it is also possible to use an excess of the amine employed.

The reaction products are isolated by dissolving the reaction mixture in water, precipitating by the addition of strong hydrohalic acids or of concentrated solutions of a halide, especially sodium chloride or potassium iodide. From the aqueous solution of these hydrohalides, the free bases are separated by the addition of substances having an alkaline action, for example ammonia.

In the method (d) of the process of the present invention, there are used as starting substances 2-(2-phenyl)-6-benzimidazolyl)-6-piperazino-benzimidazole derivatives in which the phenyl nucleus Ar is substituted by a halogen atom or by an etherified hydroxy group. The compounds are reacted with ammonia, primary or secondary aliphatic amines, for example dimethylamine, diethylamine or ethylamine, propylamine, in the manner described under (c). By this method, there are obtained only dibasic compounds as those obtained by the method (e).

As compounds of the general Formula I which are used as starting substances in the method (e) of the process of the present invention, there may be mentioned derivatives of 2-[2-(4-nitrophenyl)-6-benzimidazolyl]-benzimidazole which are substituted in the 6-position by piperazino radicals which may be substituted at the nitrogen atom.

These compounds are hydrogenated in a solvent, preferably in an alcohol such as methanol, ethanol, methyl-glycol or dimethyl-sulfoxide in the presence of finely dispersed metals of Group VIII of the Periodic System. The reaction is carried out at ordinary pressure or at an elevated pressure, preferably at 50 atmospheres gauge pressure. The products are isolated by evaporation of the filtrate to dryness and azeotropic elimination of the water, dissolution of the residue in a solvent such as methanol and precipitation by means of a second solvent in which the products are sparingly soluble, for example acetone or methylethyl-ketone. It is also possible to operate with reducing agents such as iron powder in an acid solution, ferrous-hydroxide suspensions, sodium hydrosulfide, sodium hyposulfite or stannous-chloride in hydrochloric solution. As compounds of the general Formula I which may be used as starting substances in the method of operation (f) of the process of the present invention, there may be mentioned derivatives of 2-(2-phenyl-6-benzimidazolyl)-benzimidazole in which the phenyl nucleus is substituted by an alkoxy radical, for example, a methoxy, ethoxy, propoxy, isopropoxy, butoxy, isobutoxy, β-methoxy-ethoxy, β-methoxy-propoxy, γ-methoxy-propoxy or β-hydroxy-ethoxy group, while carrying in 6-position the 4-piperazino group, and its derivatives substituted at the $N_1$-atom.

This reaction is carried out by heating the above-mentioned starting substances with ether-dissociating agents such as strong hydrohalic acids, preferably concentrated hydrobromic acid, or by melting them with the hydrochlorides of tertiary organic bases such as pyridine or dimethyl-aniline. The products are isolated by dissolving the reaction mixture in water and combining with substances having an alkaline action, for example, ammonia. If desired or necessary, the reaction mixture may be evaporated to dryness prior to dissolving it in water.

As compounds of the general Formula I which are used as starting substances in the method (g) of the process of the present invention, there may be mentioned 2-(2-phenyl - 6 - benzimidazolyl) - 6 - (1-benzyl-4-piperazino)-benzimidazole and its derivatives which are substituted by the radicals $R_1$ and $R_3$.

The starting substances, suitably in form of their hydrohalides, are hydrogenated in a solvent such as aqueous low molecular weight aliphatic alcohols, for example, methanol, in the presence of metals of Group VIII of the Periodic System, for example, finely distributed platinum or palladium, at room temperature or at an elevated temperature, if desired or required with application of an excess pressure of hydrogen. Isolation of the products can be effected by evaporation of the reaction mixture, dissolution in water and addition of ammonia or also by recrystallization of the hydrochlorides from the hydrogenated solution, if necessary or desired with the addition of a substance having the same ions, for example, strong hydrohalic acids or easily soluble hydrohalides such as sodium chloride or potassium iodide.

When isolated as free bases, the products of the invention separate in most cases in form of their hydrates having a smaller or higher content of water; in general, they have no characteristic sharp melting points. On the other hand, however, the products of the invention can be distinctly characterized by the typical green fluorescence of their solutions in alcohols, for example methanol, whereas the starting substances are not fluorescent or have a deep blue fluorescence. The nitrogen analyses are advantageously carried out according to the method described by J. Unterzaucher, Chem. Ing. Technik 22, 128 (1950) or Mikrochemie 36/37, page 706 (1951), in order to obtain exact data.

As acids which may be used for the salt formation of the basic products of the invention, there may be mentioned, for example hydrochloric acid, phosphoric acid, acetic acid, citric acid and maleic acid.

The products of the present invention may be used as medicaments, either as such or in the form of their salts with non-toxic acids. They have a strong anthelmintic activity which is particularly directed against filariae, whereas the known anthelmintic agent "Diethylcarbamazine" is only weakly active against the filarae *Litomosoides carinii* in rats and the compounds 2-(2-phenyl-6-benzimidazolyl)-6-methyl-benzimidazole and 2-(2-phenyl-6-benzimidazolyl)-benzimidazole, which both do not contain a piperazino radical and which are known from Chem. Abstr. 48, column 4523c, have no anthelmintic action.

In order to test the anthelmintic action, cotton rats which had been infested with *Litomosoides carinii* were treated subcutaneously according to the method described by K. Rohde, Z. Tropenmedizin 10, 385 (1959), on five consecutive days, with different doses of the compounds to be tested. After 3 weeks, 0.05 ml. of blood was taken from the tail or from the canthus, mixed with 5 ml. of distilled water in a centrifugation tube and centrifuged for 2 minutes at 3000 revolutions. Then, such a quantity of liquid was removed that the remainder just filled a Zschukke counting chamber and the number if microfilariae was then determined. After one week, the rats were killed and dissected and then the test was made whether the adult worms, i.e., the macrofilariae, were still alive. This test was effected by transferring the worms to a 0.9% sodium chloride solution heated to 37° C., in which the live worms moved around very actively, whereas the dead worms remained motionless.

In this test, the following values of the dosis minima curativa, upon subcutaneous administration, against microfilariae were found:

| | Dosis minima curativa, in mg./kg. |
|---|---|
| Known compounds: | |
| 2-(2-phenyl-6-benzimidazolyl)-benzimidazole | Inactive |
| Diethylcarbamazine | 30 |

Products of the invention

| Example: | Dosis minima curativa, mg./kg. |
|---|---|
| 1 | 6 |
| 2b | 1 |
| 2c | 10 |
| 2d | 2.5 |
| 2f | 2.5 |
| 2g | 2 |
| 2h | 4 |
| 2i | 4 |
| 2k | 10 |
| 2l | 10 |
| 2m | 2 |
| 2n | 25 |
| 2o | 20 |
| 2q | 2 |
| 2r | 10 |
| 2s | 5 |
| 3 | 1.5 |
| 4 | 1 |
| 5a | 2 |
| 5b | 2 |
| 5c | 4 |
| 5d | 25 |
| 5e | 4 |
| 5f | 4 |
| 5g | 5 |
| 5h | 4 |
| 11 | 10 |

In addition, thereto, the products of the present invention are also active against macrofilariae, whereas the known compounds have no such action.

Thus, for example, the dosis minima curativa of the compounds of the invention against macrofilariae is:

| Compound of example: | Dosis minima curativa, mg./kg. |
|---|---|
| 1 | 5 |
| 2f | 20 |
| 2g | 10 |
| 5b | 20 | under the test conditions described above.

The products of the present invention, when applied parenterally, are suitable for the therapy of human filarioses, especially those caused by *Wuchereria bancrofti*, *Loa loa* and *Brugia malayi*.

Furthermore, the products of the present invention have an extraordinarily strong bacteriostatic action against gram-positive germs. The values given in the following table were determined in a series dilution test against the germs *Staphylococcus aureus* SG511, Hemol. *Streptococcus A* and *Enterococcus faecium*. In this table, the numerical values signify:

0—no inhibition up to 1000γ/ml.
1—inhibition in the range of 100–1000γ/ml.
2—inhibition in the range of 10–100γ/ml.
3—inhibition in the range of 1–10γ/ml.
4—inhibition in the range of 0.1–1γ/ml.
5—inhibition in the range of 0.01–0.1γ/ml.

| | Inhibition against— | | |
|---|---|---|---|
| | Staph. aur. | Hemol. Strept., | Enterococc. |
| Product of Example: | | | |
| 2a | 3 | 4 | 2 |
| 2b | 4 | 4 | 4 |
| 2c | 3 | 4 | 3 |
| 2e | 4 | 4 | 4 |
| 2l | 4 | 4 | 4 |
| 2m | 3 | 4 | 3 |
| 2r | 3 | 5 | 2 |
| 2s | 3 | 5 | 3 |
| 5c | 5 | 3 | 3 |
| 5d | 2 | 4 | 3 |
| 5e | 3 | 4 | 2 |
| 5f | 3 | 4 | 3 |
| 5g | 3 | 4 | 2 |
| 5h | 3 | 4 | 3 |

The products of the present invention are suitable as medicaments against infestations with filariae; they are administered subcutaneously or intramuscularly in form of their aqueous solutions.

The following examples illustrate the invention but they are not intended to limit it thereto:

EXAMPLE 1

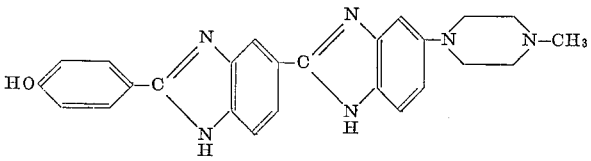

(a) 205 grams of 2-(3,4-diamino-phenyl)-6-(1-methyl-4-piperazino)-benzimidazole in 1 l. of glacial acetic acid were heated for 2 hours on a steam bath, under an atmosphere of nitrogen, with 160 g. of 4-hydroxy-benzimino-ethyl-hydrochloride. The glacial acetic acid was then evaporated under reduced pressure, the residue was dissolved in 350 ml. of water and the solution was combined with a mixture of 1 l. of isopropanol and 100 ml. of concentrated ammonia. The whole was stirred for one hour on the steam bath. After cooling, it was filtered off with suction, washed with isopropanol and then with water and dried on the steam bath. For purification, the crude 2-[2-(4-hydroxy-phenyl)-6 - benzimidazolyl]-6-(1-methyl-4-piperazino-benzimidazole as dissolved in 3.2 l.

of boiling methanol. The hot solution was combined with 600 ml. of water and treated with charcoal. The filtrate was combined, while still hot, with 1.2 liters of water and allowed to cool. After standing for several hours, the magma-like precipitate was filtered off with suction, washed with isopropanol and then with absolute ether and dried on the steam bath. Yield: 110 g. The product melts at 235° C. upwards with decomposition. Nitrogen for 2 $H_2O$: Calculated: 18.3. Found: 18.2.

For conversion into the hydrochloride, the base was dissolved in methanol, the solution was combined with an alcoholic solution of hydrogen chloride and the hydrochloride was precipitated by means of acetone. It was filtered off with suction, washed with acetone and dried on the steam bath. Yield: 127 g., decomposition point: 280° C.

In order to obtain the phosphate, 42.4 g. of the above base were dissolved in a mixture of 400 ml. of water and 40 ml. of glacial acetic acid on the steam bath and, while stirring, 12 g. of a 85% phosphoric acid and then 500 ml. of methanol were added. After a short boiling up, a yellow precipitate separated; the whole was stirred for 1 hour, with heating, allowed to cool and filtered off with suction. After washing three times with water, the product was dried on the steam bath. Yield: 31 g. Decomposition point: 315° C.

(b) The preparation of the 2-(3,4-diamino-phenyl)-6-(4-piperazino)-benzimidazoles required as starting substances, was effected according to the following reaction scheme:

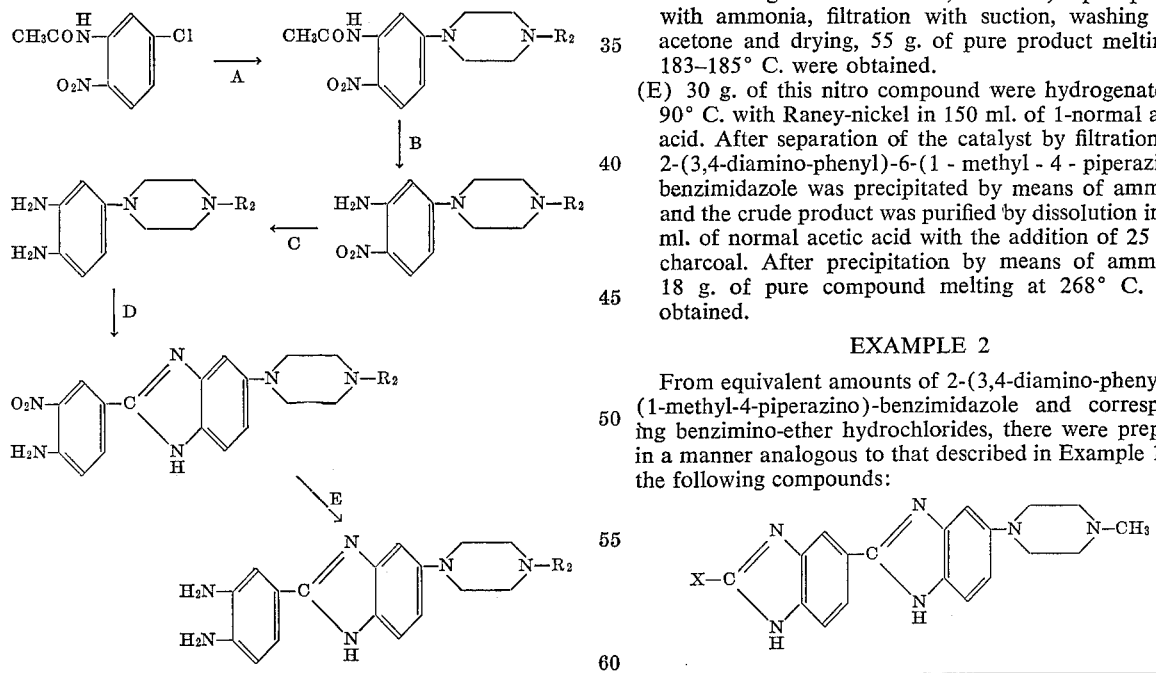

$R_2=CH_3$:

(A) 50 g. of 5-chloro-2-nitro-acetanilide were heated for 4 hours under reflux with 30 g. of 1-methyl-piperazine and 33 g. of anhydrous potassium carbonate in 50 ml. of dimethylformamide, the mixture was combined with 300 ml. of water and filtered off with suction. For purification, the product was dissolved in dilute hydrochloric acid, clarified with charcoal and the 5-(1-methyl-4-piperazino)-2 - nitro-acetanilide was precipitated again by the addition of a sodium hydroxide solution. Yield: 54 g. Melting point: 135° C.

(B) By boiling the whole for one hour in a mixture of 100 ml. of water and 50 ml. of concentrated hydrochloric acid, evaporating to dryness, dissolving the residue in water and precipitating with a sodium hydroxide solution, 44 g. of 5-(1-methyl-4-piperazino)-2-nitro-aniline melting at 155° C. were obtained.

(C) 40 g. of this product were hydrogenated with Raney-nickel in 120 ml. of methanol, separated from the catalyst by filtration and the solvent was separated by evaporation. The 5-(1-methyl-4-piperazino)-1,2-diamino-benzene thus obtained was used as crude product for the further reaction.

(D) 51 g. of 3-nitro-4-amino-benzimino-ether hydrochloride in 300 ml. of glacial acetic acid were stirred for 2 hours on the steam bath with the crude product obtained according to (C). The glacial acetic acid was distilled off, the residue was dissolved in 500 ml. of water, filtered hot and the 2-(3-nitro-4-aminophenyl)-6-(1-methyl-4-piperazino)-benzimidazole was precipitated by means of ammonia. After purification by dissolution in a mixture of 250 ml. of methanol and 30 ml. of glacial acetic acid, filtration, reprecipitation with ammonia, filtration with suction, washing with acetone and drying, 55 g. of pure product melting at 183–185° C. were obtained.

(E) 30 g. of this nitro compound were hydrogenated at 90° C. with Raney-nickel in 150 ml. of 1-normal acetic acid. After separation of the catalyst by filtration, the 2-(3,4-diamino-phenyl)-6-(1 - methyl - 4 - piperazino)-benzimidazole was precipitated by means of ammonia and the crude product was purified by dissolution in 500 ml. of normal acetic acid with the addition of 25 g. of charcoal. After precipitation by means of ammonia, 18 g. of pure compound melting at 268° C. were obtained.

EXAMPLE 2

From equivalent amounts of 2-(3,4-diamino-phenyl)-6-(1-methyl-4-piperazino)-benzimidazole and corresponding benzimino-ether hydrochlorides, there were prepared in a manner analogous to that described in Example 1(a), the following compounds:

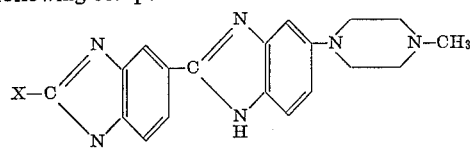

|   | Substituent of the benzimido-ether hydrochloride | Product X | Melting point | Nitrogen, percent Calc. | Found |
|---|---|---|---|---|---|
| a | 2-hydroxy- | 2-hydroxy-phenyl- | From 200° C. up | 19.0 (1 $H_2O$) | 19.2 |
| b | 4-methoxy- | 4-methoxy-phenyl- | 255° C | 18.1 (1½ $H_2O$) | 18.5 |
| c | 3-methoxy- | 3-methoxy-phenyl- | 220° C | 18.8 (½ $H_2O$) | 18.9 |
| d | 4-propoxy- | 4-propoxy-phenyl- | 286° C | 17.3 (1 $H_2O$) | 17.5 |
| e | 4-ethoxy- | 4-ethoxy-phenyl- | 268° C | 17.5 (1½ $H_2O$) | 17.3 |
| f | 4-butoxy- | 4-butoxy-phenyl- | 270° C | 16.4 (½ $H_2O$. ½ $C_2H_5OH$) | 16.4 |
| g | 3,4-methylene-dioxy- | 3,4-methylenedioxy-phenyl- | From 200° C. up | 17.2 (2 $H_2O$) | 17.0 |
| h |  | 2-phenyl- | 190° C | 18.5 (1½ $H_2O$. ⅓ $C_3H_7OH$) | 18.4 |
| i | 4-methyl- | 4-methyl-phenyl- | From 200° C. up | 18.2 (1 $H_2O$. ½ $C_2H_5OH$) | 18.1 |
| k | 3-methyl- | 3-methyl-phenyl- | 236° C | 19.1 (1 $H_2O$) | 19.1 |
| l | 4-chloro- | 4-chloro-phenyl- | From 200° C. up | 17.9 (1½ $H_2O$) | 18.1 |
| m | 4-dimethylamino- | 4-dimethylaminophenyl- | 210° C | 20.1 (2 $H_2O$) | 20.0 |
| n | 3-chloro-4-methyl- | 3-chloro-4-methylphenyl- | From 200° C. up | 17.7 (1 $H_2O$) | 17.9 |
| o | 4-chloro-3-methyl- | 4-chloro-3-methylphenyl- | 256° C | 18.4 | 18.5 |
| p | 3-nitro-4-amino- | 3-nitro-4-aminophenyl- | 240° C | 22.2 (2 $H_2O$) | 21.9 |
| q | 4-phenyl- | 4-diphenyl- | 310° C | 16.7 (1 $H_2O$) | 16.4 |
| r | 2-naphthylimino-ether hydrochloride | 2-naphthyl- | 245° C | 18.0 (½ $H_2O$) | 17.9 |
| s | 3-nitro-4-(2-diethyl-aminoethyl-amino)- | 3-nitro-4-(2-diethyl-ethylamino-ethylamino)-phenyl- | 294° C | 21.9 (½ $H_2O$) | 22.0 |
| t | 4-nitro- | 4-nitro-phenyl- | 210° C | 19.3 (3 $H_2O$) | 19.0 |

EXAMPLE 3

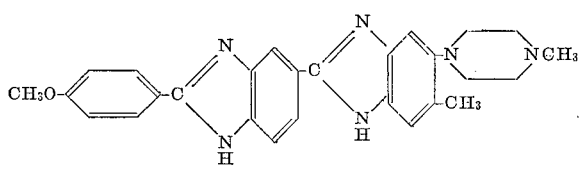

2-[2-(4-methoxy-phenyl)-6-benzimidazolyl]-5-methyl-6-(1-methyl-4-piperazino)-benzimidazole 11.3 g. of 2-(3,4-diamino-phenyl)-5-methyl-6-(1-methyl-4-piperazino)-benzimidazole were heated for 2 hours on the steam bath in 80 ml. of glacial acetic acid with 8 g. of 4-methoxybenzimino-ether hydrochloride and worked up as described in Example 1(a). For purification, the crude product was dissolved in 100 ml. of isopropanol in the heat, filtered off while hot and the filtrate was combined with 10 ml. of water. After cooling, the hydrate of 2-[2-(4-methoxy-phenyl)-6-benzimidazolyl]-5-methyl-6-(1-methyl-4-piperazino)-benzimidazole that had separated was filtered off with suction, washed with isopropanol and ether and dried on the steam bath. Yield: 10.3 g. Melting point: from 196° C. upwards (with sintering). Nitrogen: Calcd.: 17.5 (.1½ $H_2O$). Found: 17.4.

For conversion into the hydrochloride, the method described in Example 1(a) was used.

For preparing the 2-(3,4-diamino-phenyl)-5-methyl-6-(1-methyl-4-piperazino)-benzimidazole required as the starting substance, 50 g. of 6-chloro-3-nitro-4-acetamino-toluene in 50 ml. of dimethyl-formamide were stirred for 2 hours under reflux with 30 g. of 1-methyl-piperazino and 30 g. of potassium carbonate and the 4-methyl-5-(1-methyl-4-piperazino)-2-nitroacetanilide was isolated according to the method described in Example 1(b) under (A). Yield: 44 g. Melting point 166° C.

The hydrolysis to obtain 4-methyl-5-(1-methyl-4-piperazino)-2-nitro-aniline (melting point: 208° C.), the hydrogenation to obtain the 4-methyl-5-(1-methyl-4-piperazino)-1,2-diamino-benzene and the reaction with 3-nitro-4-amino-benzimino-ether hydrochloride to obtain 2-(3-nitro-4-amino-phenyl) - 5 - methyl-6-(1 - methyl-4-piperazino)-benzimidazole (melting point 280° C.) as well as the hydrogenation of this product to obtain 2-(3,4-diamino-phenyl)-5-methyl-6-(1-methyl - 4 - piperazino) - benzimidazole melting at 155° C., was likewise carried out in a manner analogous to that described in Example 1(b) (B–E).

EXAMPLE 4

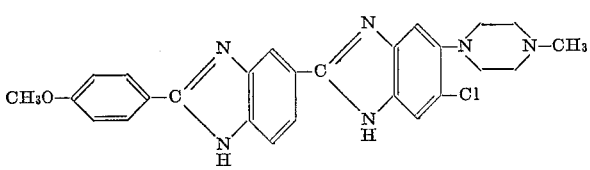

2-[2-(4-methoxy-phenyl)-6-benzimidazolyl]-5-chloro-6-(1-methyl-4-piperazino)-benzimidazole 12 g. of 2-(3,4-diamino-phenyl)-5-chloro-6-(1-methyl-4-piperazino)-benzimidazole in 100 ml. of glacial acetic acid were heated for 2 hours on the steam bath with 8 g. of 4-methoxy-benzimino-ether hydrochloride and the product was worked up as described in Example 1(a). For purification, the crude product was dissolved in 100 ml. of hot isopropanol, filtered while still hot and combined with 15 ml. of water. After cooling, the hydrate of 2-[2-(4-methoxy-phenyl)-6 - benzimidazolyl]-5-chloro-6-(1-methyl-4-piperazino)-benzimidazole that had separated was filtered off with suction, washed with isopropanol and ether and dried on the steam bath. Yield: 12 g. Melting point: 207° C. (with sintering). For conversion into the hydrochloride, the method described in Example 1(a) was used. Nitrogen: Calcd.: 16.5 (.4$H_2O$). Found: 16.5.

For preparing the 2-(3,4-diamino-phenyl)-5-chloro-6-(1-methyl-4-piperazino)-benzimidazole required as the starting substance, 60 g. of 4,5-dichloro-2-nitro-acetanilide were boiled for half an hour under reflux in 50 ml. of dimethylformamide with 35 g. of 1-methyl-piperazino and 35 g. of potassium carbonate, and the 4-chloro-5-(1-methyl-4-piperazino)-2-nitro-acetanilide was isolated in a yield of 58 g. (melting point 150° C.) according to the method described in Example 1(b) under A. The further reactions via the 4-chloro-5-(1-methyl-4-piperazino)-2-nitro-aniline (melting point 202° C.), 4-chloro-5-(1-methyl-4-piperazino)-1,2-diamino-benzene and 2-(3-nitro - 4-amino-phenyl)-5-chloro-6-(1 - methyl - 4 - piperazino)-benzimidazole (melting point 298° C.) to 2-(3,4-diamino-phenyl)-5-chloro-6-(1-methyl - 4 - piperazino)benzimidazole (melting point 258° C.) were likewise carried out under the conditions described in Example 1(b) (B–E).

EXAMPLE 5

From 12 g. of 4-methoxy-benzimino-ether hydrochloride and 16.8 g. of 2-(3,4-diamino-phenyl)-6-(1-ethyl-4-piperazino)-benzimidazole or equivalent amounts of 2-(3,4-diamino-phenyl)-6-(1 - substituted - 4 - piperazino)-benzimidazoles, the following compounds were prepared according to the method described in Example 1(a):

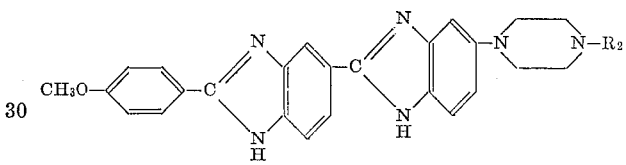

| Product | $R_2$ | Melting point, °C. | Nitrogen, percent Calc. | Found |
|---|---|---|---|---|
| a | Ethyl | 188 | 17.9 (.1 $H_2O$) | 18.0 |
| b | Isopropyl | 214 | 16.1 (.2 $H_2O$.½ $C_3H_7OH$) | 16.0 |
| c | Butyl | 260 | 16.7 (.1½ $H_2O$) | 16.9 |
| d | Benzyl | 169 | 16.1 (½ $H_2O$) | 16.5 |
| e | H | 267 | 14.1 (3½ $H_2O$) | 14.2 |
| f | β-Hydroxyethyl | 190 | 17.0 (1½ $H_2O$) | 16.6 |
| g | Carbethoxy | 285 | 17.0 | 17.1 |
| h | β-Diethylaminoethylamino | 166 | 17.8 (1½ $H_2O$) | 17.8 |
| i | Phenyl | 300 | 16.8 | 16.7 |

For preparing the 2-(3,4-diamino-phenyl)-6-(1-substituted-4-piperazino)-benzimidazoles (II) required as the starting substances, equivalent amounts of 5-chloro-2-nitro-acetanilide were reacted with 1-substituted piperazino derivatives according to the reaction order (A→B→C→D→E) described in Example 1(b).

| | $R_2$ | Melting points (in °C.) of the intermediate products obtaining according to the method described in Example 1(b) | | | | |
|---|---|---|---|---|---|---|
| | | A | B | C | D | E |
| a | Ethyl | 102 | 125 | | 188 | 170 |
| b | Isopropyl | 87 | 127 | 131 | 199 | 284 |
| c | Butyl | 89 | 110 | | 170 | 267 |
| d | Benzyl | 136 | 162 | | 170 | 206 |
| e | H | | | | | |
| f | β-Hydroxyethyl | 157 | 160 | | 120 | 200 |
| g | Carbethoxy | 155 | 180 | | 120 | 231 |
| h | β-Diethylaminoethylamino | 82 | 82 | | 115 | 236 |
| i | Phenyl | 184 | 206 | 202 | 256 | 281 |

EXAMPLE 6

5 g. of 2-(3,4-diamino-phenyl)-6-(1-methyl-4-piperazino)-benzimidazole in 50 ml. of benzoyl chloride were heated on a wire net. When 120° were reached, the temperature spontaneously rose to 150° C. The whole was allowed to react for half an hour under reflux. After cooling, the yellow magma was diluted with acetone and filtered off with suction. The residue was suspended in 100 ml. of hot isopropanol and ammonia was added until the reaction was alkaline. A clear solution formed intermediarily. The thick precipitate which then separated and constituted a dibenzoyl compound of 2-(2-phenyl-6- benzimidazolyl)-6-(1-methyl - 4 - piperazino)-benzimidazole was filtered off with suction and washed with water and with isopropanol. Yield: 7.2 g. Melting point: 247° C.

The dibenzoyl product was heated for 12 hours to 200° C. in a tenfold amount of a 20% hydrochloric acid in a tube which had been closed by melting. The hydrochloric acid was evaporated under reduced pressure and the base was precipitated by the addition of ammonia. Yield: 4 g. By reprecipitation and recrystallization from a mixture of isopropanol and water, 2-(2-phenyl-6-benzimidazolyl)-6-(1-methyl-4-piperazino)-benzimidazole was obtained in a pure form which was identical with the product obtained according to Example 2(h).

EXAMPLE 7

8 g. of 2-(3,4-diamino-phenyl)-6-(1-methyl-4-piperazino)-benzimidazole (described in Example 1(b)(E)) were melted together with 6 g. of benzoic acid and this molten mass was kept for 2 hours at 200° C. After cooling, it was dissolved in acetic acid and the 2-(2-phenyl-6-benzimidazolyl)-6-(1-methyl-4-piperazino)-benzimidazole that had formed was precipitated by means of ammonia; the product was purified by dissolution in 100 ml. of isopropanol and precipitation with 50 ml. of water; it was identical with the product obtained according to Example 2(h).

EXAMPLE 8

8.1 g. of 2-(3,4-diamino-phenyl)-6-(1-methyl-4-piperazino)-benzimidazole (described in Example 1(b)(E)) were heated for 12 hours to 200° C., in a tube closed by melting, with 4 g. of benzoic acid and 75 ml. of hydrochloric acid having a strength of 20%. The reaction mixture was then combined with 500 ml. of water, undissolved matter was filtered off and the base was precipitated by means of ammonia. By reprecipitation in dilute acetic acid by means of ammonia and recrystallization from a mixture of isopropanol and water, pure 2-(2-phenyl-6-benzimidazolyl)-6-(1-methyl-4-piperazino)-benzimidazole identical with the product obtained according to Example 2(h), was obtained.

EXAMPLE 9

5.5. g. of benzaldehyde were added, while heating and stirring, to a mixture of 16.3 g. of 2-(3,4-diamino-phenyl)-6-(1-methyl-4-piperazino) - benzimidazole (described in Evample 1(b)(E)) and 20 g. of cupric-acetate in 250 ml. of 2-N acetic acid. The whole was stirred for 1 hour on the steam bath, combined with 250 ml. of concentrated hydrochloric acid, and filtered with suction after cooling. For purification, the product was mixed, while stirring, with 100 ml. of hydrochloric acid having a strength of 20% and then with acetone. Finally, it was recrystallized from a mixture of isopropanol and water; after drying, 5 g. of 2-(2-phenyl-6-benzimidazolyl)-6-(1-methyl-4-piperazino)-benzimidazole were obtained. The compound was identical with the product described in Example 2(h).

EXAMPLE 10

5.6 g. of 4-(1-methyl-4-piperazino)-1,2-diamino-benzene (described in Example 1(b)(C)) were heated for 1 hour with 10 g. of 2-phenyl-6-benzimidazole-imino ether hydrochloride in 100 ml. of glacial acetic acid. The glacial acetic acid was distilled off under reduced pressure. The product was dissolved in water and precipitated by means of ammonia. The dried crude product was recrystallized twice from 200 ml. of hot isopropanol and 30 ml. of water. Yield 6.5 g. of pure 2-(2-phenyl-6-benzimidazolyl)-6-(1-methyl - 4 - piperazino) - benzimidazole, which was identical with the product described in Example 2(h).

The 2-phenyl-6-benzimidazole-imino-ether hydrochloride required as the starting substance was obtained by heating for 1 hour under reflux 30 g. of 3,4-diamino-benzonitrile in 250 ml. of glacial acetic acid with 45 g. of benzimino-ether hydrochloride. The glacial acetic acid was distilled off under reduced pressure. The residue was dissolved in methanol, rendered alkaline by means of ammonia and finally diluted with water. For purification, the product was recrystallized from a mixture of methanol and water whereby 33 g. of pure 2-phenyl-6-benzimidazole-nitrile melting at 196° C. were obtained. Conversion into the corresponding imino-ether hydrochloride was effected by saturating, without external cooling, a solution of the nitrile in a 15-fold quantity of methyl-glycol with gaseous hydrogen chloride, allowing the whole to stand for several days and separating by filtration with suction the iminoether hydrochloride formed. After washing with absolute ether and drying over potassium hydroxide, there were obtained 37 g. of product which could be further used without purification.

EXAMPLE 11

28 g. of 2-[2-(4-nitro-phenyl)-6-benzimidazolyl]-6-(1-methyl-4-piperazino)-benzimidazole (prepared according to the method described in Example 2(t)) were hydrogenated in 400 ml. of methanol in the presence of Raney-nickel as the catalyst. The filtrate was evaporated to dryness and the water that had formed during the reaction was removed by repeated evaporations with ethanol. The pasty residue was dissolved in 100 ml. of methanol, filtered and combined with 700 ml. of acetone, whereupon the 2-[2-(4-amino-phenyl)-6-benzimidazolyl]-6-(1-methyl-4-piperazine)-benzimidazole separated as a hydrate containing 1½ mol of crystal water. Yield: 18 g.

By recrystallization from butanol, an addition product with 1 mol of butanol was obtained which was found to melt at 230° C. Nitrogen: Calcd.: 18.7. Found: 18.7.

EXAMPLE 12

49 g. of 2-[2-(4-methoxy-phenyl)-6-benzimidazolyl]-6-(1 - benzyl - 4 - piperazino) - benzimidazole - trihydrochloride were dissolved in a mixture of 500 ml. of water and 500 ml. of methanol and hydrogenated in the presence of palladium at 80° C. and under ordinary pressure. The filtrate was evaporated, the residue was combined with acetone and the precipitate was filtered off with suction.

For purification, the crude product was introduced into 800 ml. of hot methanol, the solution was filtered and allowed to stand in the heat. After a short time, pure 2-[2-(4 - methoxyphenyl) - 6 - benzimidazolyl] - 6 - (4 - piperazino)-benzimidazole-trihydrochloride precipitated in the form of a hydrate containing 3.5 mols of crystal water. After filtration with suction, washing with ether and drying on the steam bath, 25 g. of product melting at 267° C. were obtained. Nitrogen: Calculated: 14.1%. Found: 14.1%.

The 2-[2-(4-methoxy-phenyl)-6-benzimidazolyl]-6-(1-benzyl-4-piperazino)-benzimidazol-trihydrochloride used as the starting substance was prepared in the manner described in Example 1(a) from the free base described in Example 5(d).

EXAMPLE 13

5 g. of 2-[2-(4-methoxy-phenyl)-6-benzimidazolyl]-6-(1-methyl-4-piperazine)-benzimidazole were heated for 1 hour under reflux in 50 ml. of concentrated hydrobromic acid. A clear solution formed intermediarily and after some time, a dense precipitate separated. The whole was diluted, after cooling, with 100 ml. of water, combined while hot with ammonia until it showed a weakly alkaline reaction, was allowed to cool, filtered off with suction and washed with water.

After drying on the steam bath, the crude product was dissolved for purification in 50 ml. of hot isopropanol, filtered and combined with 15 ml. of water. After some standing, the hydrate of 2-[2-(4-hydroxy-phenyl)-6-benzimidazolyl]-6-(2-methyl-4-piperazino)-benzimidazole had separated; it was filtered off with suction, washed and dried. According to its melting point and fluorescence, the product was identical with the product described in Example 1(a).

EXAMPLE 14

24 g. of 2-(3,4-diamino-phenyl)-6-(1-methyl-4-piperazino)-benzimidazole (described in Example 1(b)(E)) were heated for 3 hours, while stirring, on the steam bath, in 150 ml. of methylglycol with 15 g. of benzotrichloride. The solvent was then distilled off, the residue was dissolved in 200 ml. of water and combined, at room temperature, with 200 ml. of 2-N nitric acid. On the next day, the product was filtered off with suction and washed with dilute nitric acid and with acetone. For isolating the free base, the nitrate was suspended in 500 ml. of water and ammonia was added until the reaction was alkaline. The free base was filtered off with suction and dissolved, for purification, in 250 ml. of methanol with the addition of charcoal. The filtrate was combined, while still hot, with 100 ml. of water.

The 2 - (2-phenyl-6-benzimidazolyl)-6-(1-methyl-4-piperazino)-benzimidazole obtained in this manner in pure form was found to be identical, according to its melting point and its fluorescence, with the product obtained according to example 2(h).

What is claimed is:

1. A piperazino-bis-benzimidazole compound of the formula

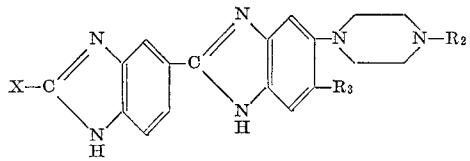

wherein X is phenyl; halophenyl; hydroxyphenyl; mercaptophenyl; alkylphenyl, alkoxyphenyl, or alkylmercaptophenyl in which said alkyl and alkoxy groups have 1–4 carbon atoms; adjacent alkylenedioxyphenyl wherein said alkylene has 1 or 2 carbon atoms; nitrophenyl; diphenylyl; aminophenyl; alkylaminophenyl and dialkylaminophenyl in which said alkyl groups have 1–4 carbon atoms; or naphthyl; $R_2$ is halogen, alkyl having 1–4 carbon atoms, β-hydroxyethyl, β-diethylaminoethyl, carbethoxy, or benzyl; and $R_3$ is hydrogen, halogen, lower alkyl, or lower alkoxy; and salts of the compound with a physiologically tolerated acid.

2. A compound as in claim 1 wherein $R_2$ is alkyl having 1–4 carbon atoms.

3. A compound as in claim 1 wherein $R_2$ is methyl.

4. A compound as in claim 1 wherein $R_3$ is hydrogen.

5. A compound as in claim 1 wherein X is 4-methoxyphenyl.

6. 2 - [2 - (4-hydroxy-phenyl)-6-benzimidazolyl]-6-(1-methyl-4-piperazino)-benzimidazole.

7. 2 - [2 - (4-methoxy-phenyl)-6-benzimidazolyl]-6-(1-methyl-4-piperazine)-benzimidazole.

8. 2 - [2 - (3,4 - methylenedioxy-phenyl)-6-benzimidazolyl]-6-(1-methyl-4-piperazino)-benzimidazole.

References Cited

UNITED STATES PATENTS

| | | | |
|---|---|---|---|
| 2,980,690 | 4/1961 | Hoffmann | 260—309.2 |
| 3,072,661 | 1/1963 | Pizzarello | 260—282 |
| 3,103,403 | 9/1963 | Eaton et al. | 260—282 X |
| 3,133,056 | 5/1964 | Ash et al. | 260—268 X |
| 3,310,563 | 3/1967 | Sieber et al. | 260—282 |
| 3,325,506 | 6/1967 | Jones et al. | 260—309.2 X |
| 3,336,191 | 8/1967 | Craig | 260—309.2 X |
| 3,362,956 | 1/1968 | Archer | 260—268 |
| 3,418,318 | 12/1968 | Lambie | 260—309.2 X |

DONALD G. DAUS, Primary Examiner

U.S. Cl. X.R.

260—309.2, 340.8, 340.6, 465, 515, 516, 518, 521, 544, 546, 599, 689; 424—250